United States Patent [19]

Blake

[11] 4,400,131

[45] Aug. 23, 1983

[54] COMPRESSED AIR DISCHARGE SYSTEM FOR TRUCKS

[75] Inventor: Nolen C. Blake, Oak Hill, W. Va.

[73] Assignee: The Marmon Group, Inc., Chicago, Ill.

[21] Appl. No.: 297,597

[22] Filed: Aug. 31, 1981

[51] Int. Cl.³ ............... B65G 11/20; B65G 53/16; B65D 88/70; B65D 88/72
[52] U.S. Cl. ................... 414/491; 414/539; 222/195; 298/1 R; 406/137
[58] Field of Search ............ 414/469, 507, 491, 539; 406/88, 137, 154, 155, 94; 298/1 R, 1 V, 22 C; 222/195

[56] References Cited

U.S. PATENT DOCUMENTS

| | | | |
|---|---|---|---|
| 2,089,347 | 8/1937 | Donolinger | 222/195 |
| 2,353,346 | 7/1944 | Logan | 406/88 |
| 2,780,369 | 2/1957 | Kaney | 406/137 |
| 3,318,485 | 5/1967 | Landeborg | 222/195 |
| 3,671,079 | 6/1972 | Huffaker | 406/137 |
| 4,059,311 | 11/1977 | Spitzer et al. | 222/195 |
| 4,175,906 | 11/1979 | Johnston et al. | 414/469 |

FOREIGN PATENT DOCUMENTS 706628 3/1954 United Kingdom ............ 222/195

Primary Examiner—Bruce H. Stoner, Jr.
Assistant Examiner—James Barlow
Attorney, Agent, or Firm—Beveridge, DeGrandi & Kline

[57] ABSTRACT

A compressed air discharge system for facilitating the unloading of material from the dump bed of such as a dump truck, and which is designed for interconnection with the compressed air system of the dump truck. The compressed air discharge system preferably includes an air tank having a conduit interconnected therewith for discharge of compressed air from such air tank and into the dump bed in juxtaposition to generate air shear planes through material lodged within the dump bed, an air supply circuit being interconnected to the compressed air system of the dump truck and the air tank for transmission of compressed air from the dump truck compressed air system to the air tank, the air supply circuit including a valve for selectively bleeding compressed air from the dump truck compressed air system and into the air supply circuit, a valve for preventing discharge of air from the air tank and back through the air supply circuit, and a quick release valve for discharge of a substantial blast of compressed air from the air tank and into the dump bed through the conduit interconnected to the air tank.

12 Claims, 8 Drawing Figures

COMPRESSED AIR DISCHARGE SYSTEM FOR TRUCKS

BRIEF BACKGROUND, FIELD AND OBJECTIVES OF THE INVENTION

This invention relates to improvements in devices for facilitating the unloading of material lodged in the dump bed of dump trucks and the like by way of discharging a blast of compressed air into the dump bed of the truck.

I recognize that others have used pressurized gases to promote the flow of compacted bulk materials from storage bins, silos, and the like. For instance, by way of using compressed air tanks having a discharge head extending interiorly of the bin, silo, or the like, for release of a blast of compressed air from the air tanks and through the discharge head thereof to loosen compacted bulk material stored therewithin. In installations of this type, discharge from the compressed air tanks is only infrequently required and, being at a fixed location, a compressor can be located nearby. Thus, no appreciable problems are encountered in removal, recharging and replacing of air tanks after use thereof to loosen compacted or bridged material in a bin, silo, or the like.

It is, of course, impractical for a dump truck to have any tube-like discharge head extending within the dump bed thereof, since the dump truck will be normally used to carry all manner of material, and filling of the dump bed with such as large rocks or mass dumping therein of even particulate material, such as from a front end loader, would likely bend such discharge head and render it inoperative.

Also, since dump trucks frequently shuttle back and forth between the place of loading and the dump site, it is impractical to interrupt the payload cycle for removal, replacement or servicing of adjunct truck equipment.

Dump truck operators frequently experience difficulty in the unloading of material from the dump bed of their truck. This is especially true when the material involved is particulate and even more so when the loaded truck has been driven any appreciable distance, in which case the particulate material may have become extremely compacted by vehicular vibration.

Some truck operators attempt to remove lodged material from the dump bed by repeatedly raising the dump bed and then letting the same drop back onto the truck chassis. Such a procedure is obviously quite likely to cause damage to the truck. Others resort to shovelling out or otherwise manually loosening the lodged material, which can sometimes be a hazardous operation, particularly if attempted when the dump bed is in a dumping position.

If the lodged material is not removed, then that payload is short by the amount of lodged material remaining in the dump bed and, until such lodged material is removed, all following payloads will also be reduced by this amount. Further, if the lodged material is in the upper end of the dump bed as raised for dumping, the center of gravity of the truck is elevated to such an extent as to be liable to turn over.

Most dump trucks have a compressed air system for operation of their air brakes, horn, etc. Such compressed air system usually generates more than enough compressed air for operation of the conventional equipment of the truck, the excess of which is usually vented from the system. My invention provides for use of compressed air from the compressed air system of the truck to loosen material lodged in the dump bed thereof.

It is thus a primary object of this invention to provide a compressed air discharge system for use of the overabundance of compressed air generated by the compressed air system of a dump vehicle to facilitate unloading of material lodged in the dump bed thereof.

A further object of the invention is the provision of a compressed air discharge system including air tank means for storing compressed air and which is releasable into the dump bed of a dump vehicle for loosening material lodged in the dump bed thereof and an air supply circuit interconnected to such air tank means and to the compressed air system of the dump vehicle for transmission of compressed air from the compressed air system of the dump vehicle to the air tank means of such compressed air discharge system.

Other objects and advantages of the invention will become apparent from the following detailed description, taken in connection with the accompanying drawings, and in which drawings:

DETAILED DESCRIPTION

Figure 4:
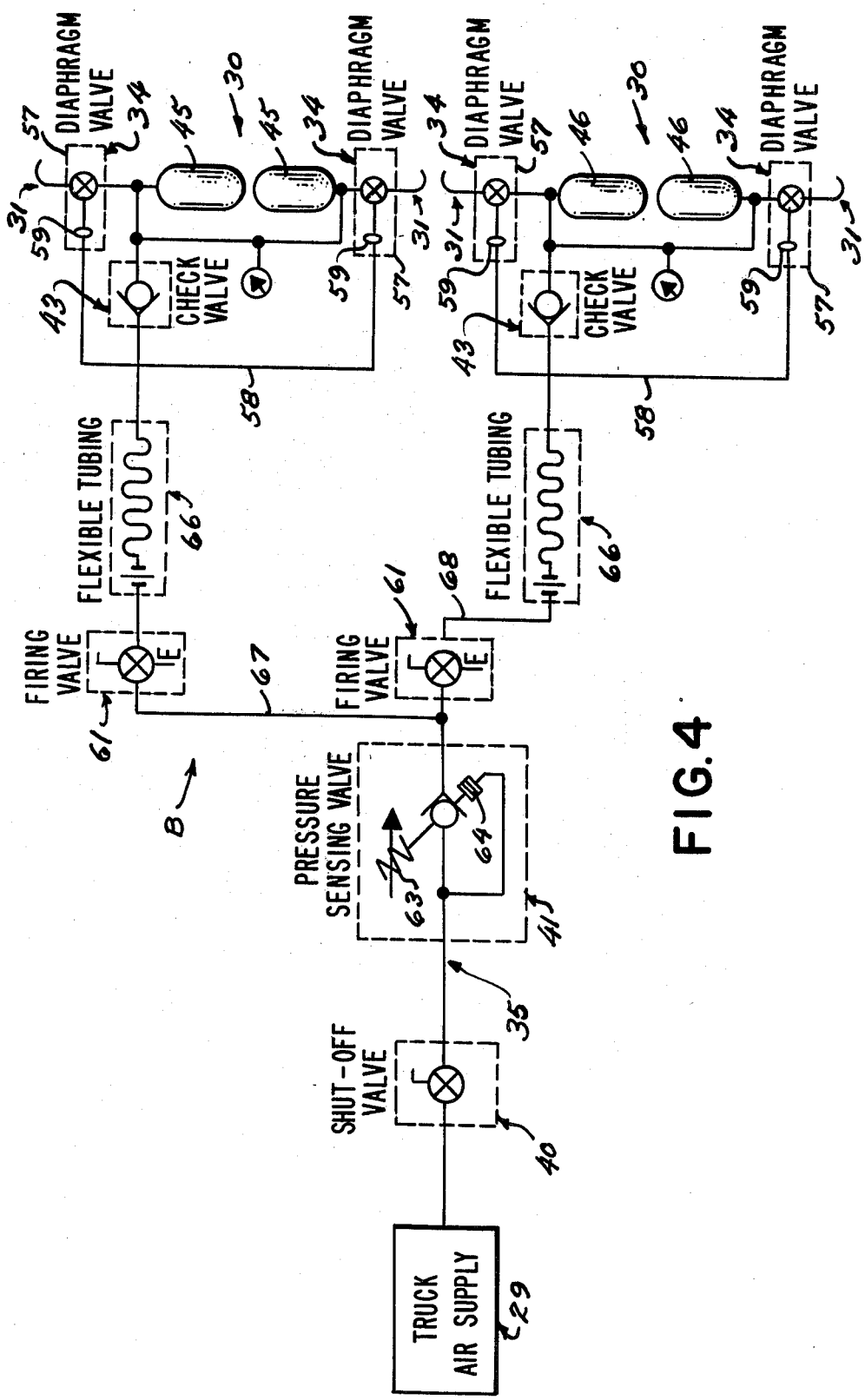
FIG. 4 is a schematic view of the compressed air discharge system of FIG. 1.
Figure 7:
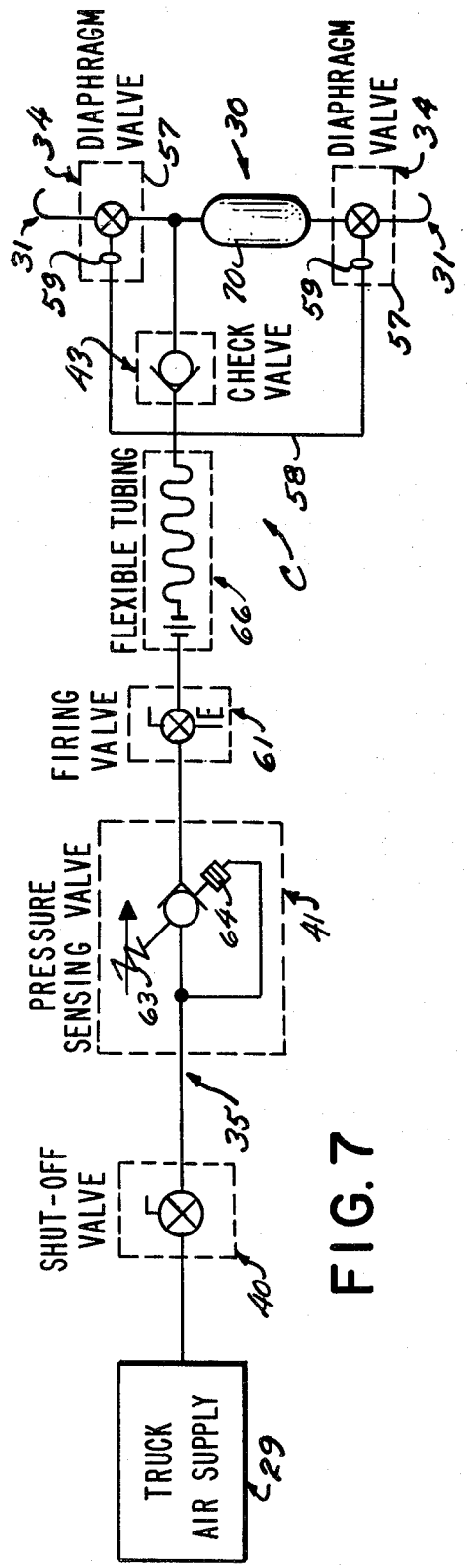
FIG. 7 is a schematic view of the modified compressed air discharge system of FIG. 5.
Figure 8:
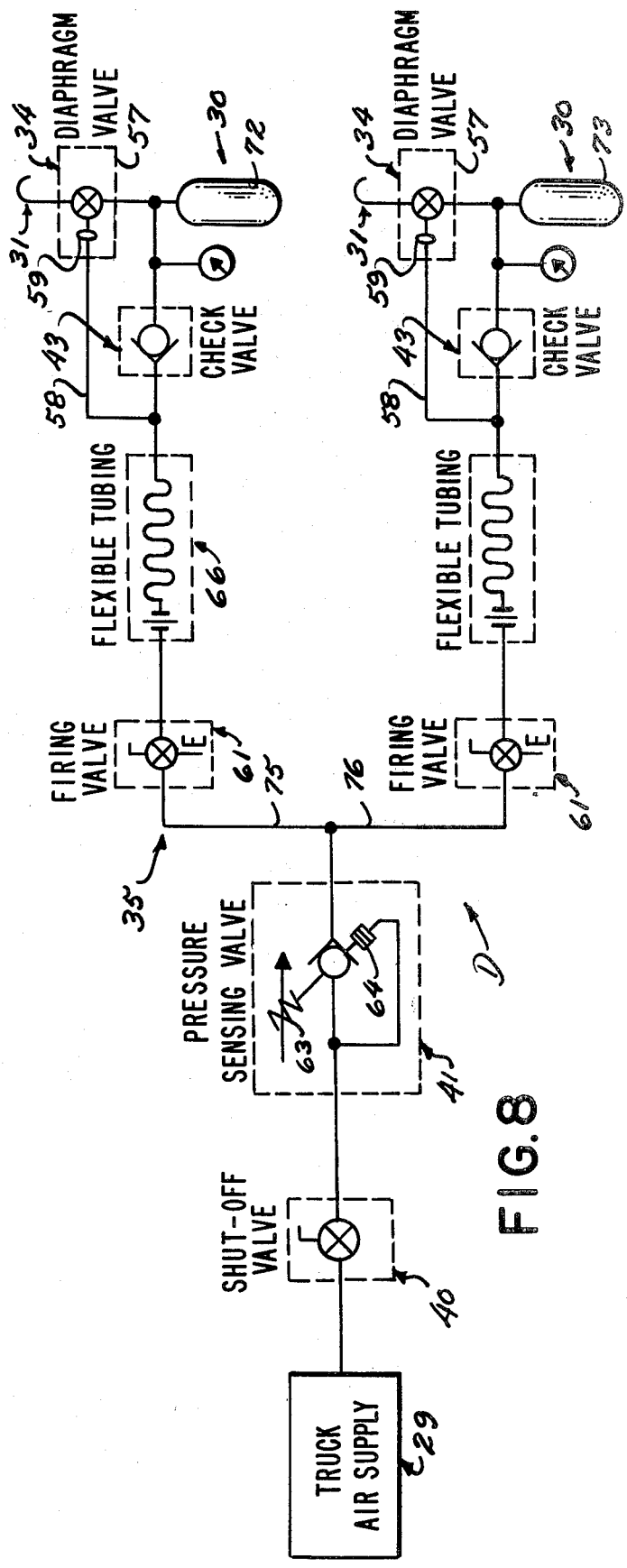
FIG. 8 is a schematic view of a further modified form of my compressed air discharge system.

In the drawings, wherein similar reference characters designate corresponding parts throughout the several views, the letter A may generally designate a dump vehicle which may receive my improved compressed air discharge system, such as compressed air discharge system B of FIG. 4; compressed air discharge system C of FIG. 7; or compressed air discharge system D of FIG. 8.

Figure 1:
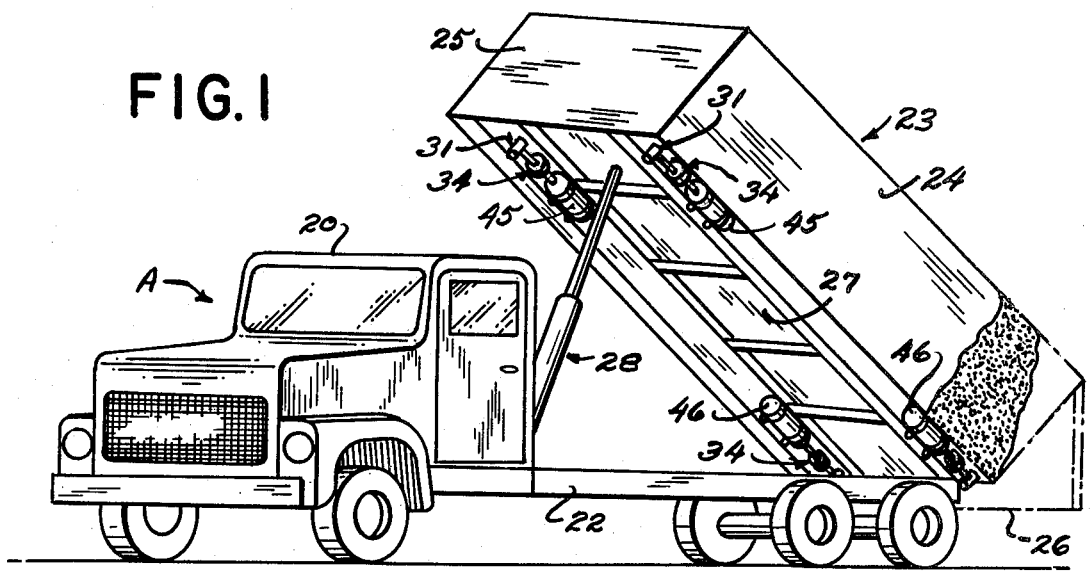
FIG. 1 is a perspective view of a dump truck including one form of my improved compressed air discharge system for unloading thereof.

As shown, dump vehicle A may comprise a conventional dump truck 20 including a chassis 22 on which may be mounted a rectangular dump bed 23 having sides 24, a forward end 25, rearward end 26 and a bottom 27, and which dump bed 23 may be inclined to a dumping position (as shown in FIG. 1) by raising forward end 25 thereof such as by conventional dump mechanism 28.

For operation of air brakes, and other equipment thereof powered by compressed air (not shown), dump truck 20 may include a compressed air system including an air compressor and a reservoir for maintaining a supply of compressed air (schematically shown as "Truck Air Supply" 29) for operation of the compressed air powered equipment thereof.

Compressed air discharge systems B, C and D each include air tank means 30, each of which have conduit means 31 interconnected thereto, conduit means 31 having an outlet 32 opening into dump bed 23; quick release valve means 34 interconnected to conduit means 31 for discharge of a substantial blast of compressed air from air tank means 30 and into dump bed 23 through conduit means 31; and an air supply circuit 35 interconnected to air tank means 30 and truck air supply 29 for transmission of compressed air from the compressed air system of dump truck 20 to air tank means 30. Each air supply circuit 35 preferably including actuator valve means 40 for selective isolation and operation of air supply circuit 35 from and in conjunction with the compressed air system of dump truck 20, pressure sensing valve means 41 to sequence flow of compressed air from truck air supply 29 and into air supply circuit 35 as air pressure of the compressed air system of dump truck 20 exceeds that required for normal working of the compressed air powered equipment of dump truck 20, and check valve means 43 for preventing discharge of compressed air from air tank means 30 and back through air supply circuit 35 when the air pressure of truck air supply 29 is less than that of air tank means 30.

Figure 3:
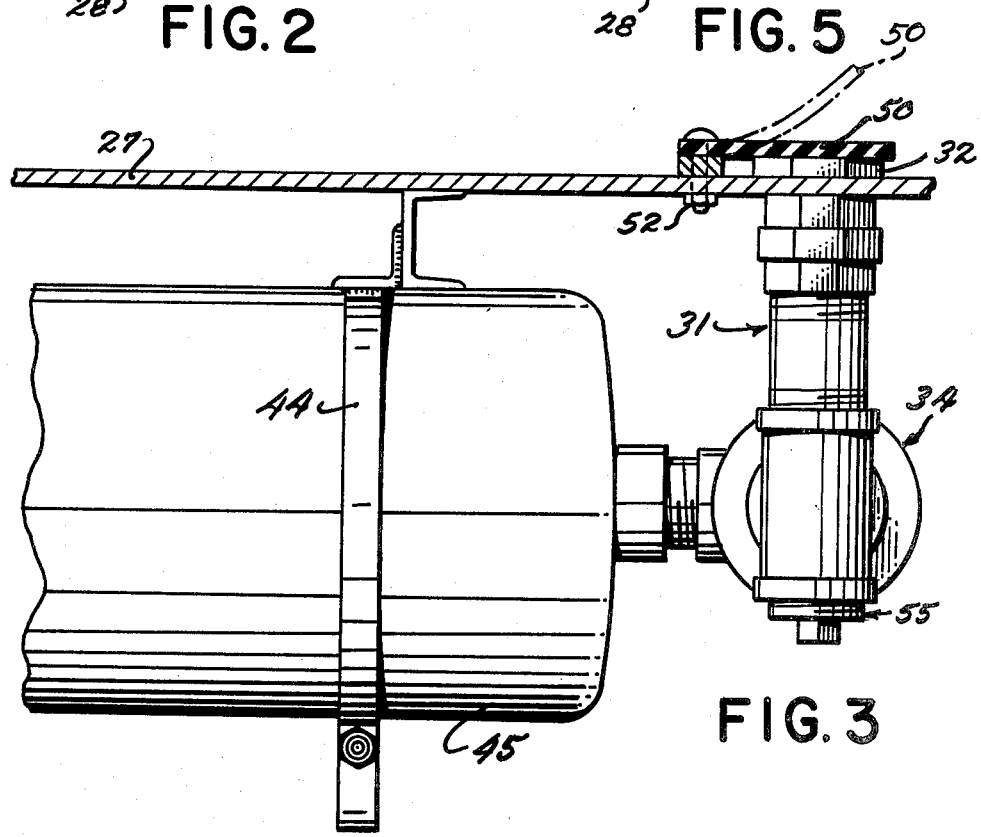
FIG. 3 is an enlarged fragmentary view showing an air tank means of the compressed air discharge system of FIG. 1, conduit means for discharge of compressed air from such air tank means and into the dump bed of the dump truck, and flap means for inhibiting material in the dump bed from entering the discharge outlet of the conduit means.
Figure 6:
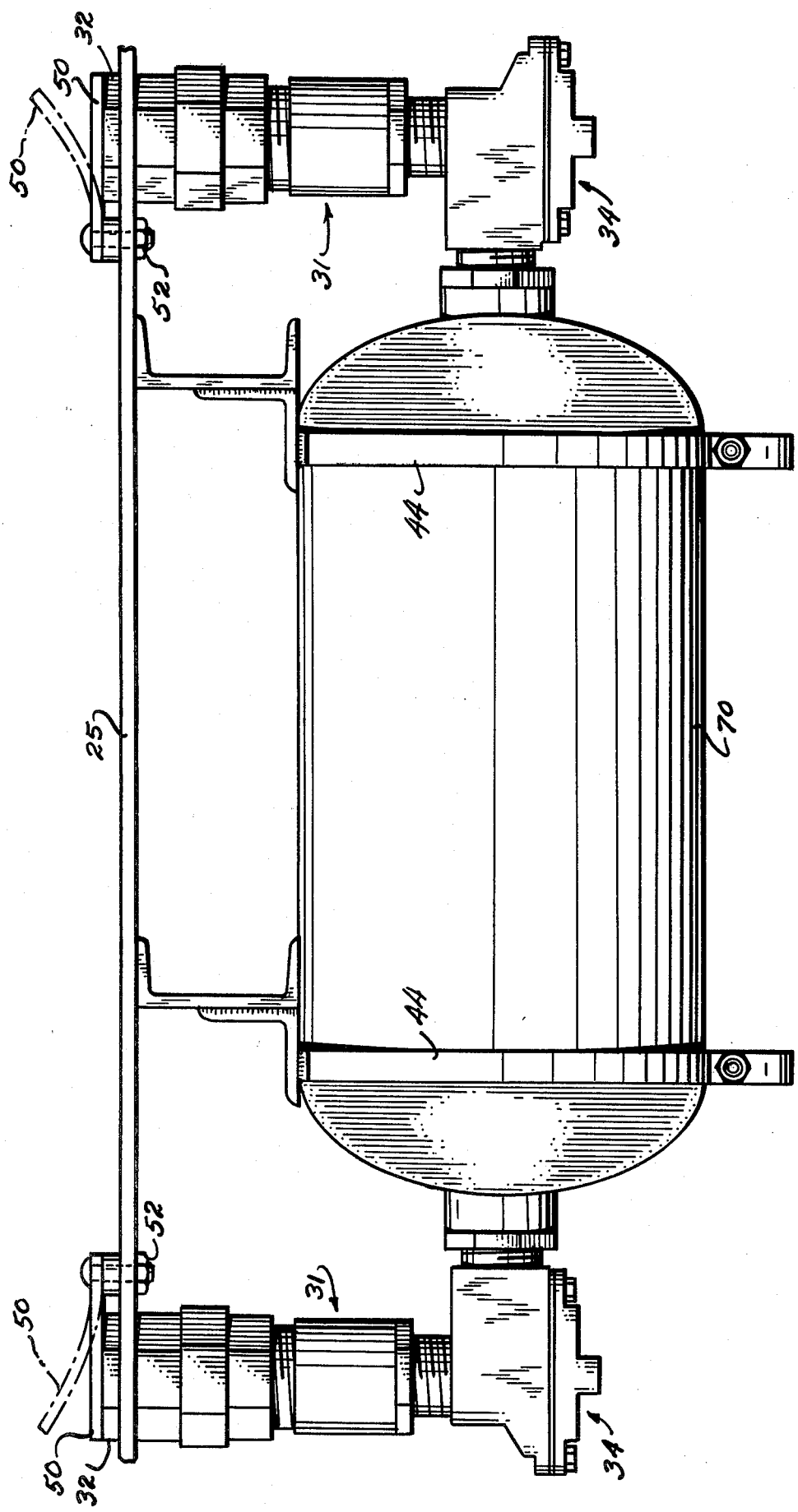
FIG. 6 is an enlarged fragmentary view showing an air tank means of the modified compressed air discharge system of FIG. 5, conduit means for discharge of compressed air from such air tank means and into the dump bed of the dump truck, and flap means for inhibiting material in the dump bed from entering the discharge outlet of the conduit means.

Air tank means 30 may be attached to dump body 23 such as by straps 44, as shown in FIGS. 3 and 6.

The controls for operation of actuator valve means 40 and quick release valve means 34 may be mounted at any convenient location on dump truck 20.

In compressed air discharge system B, air tank means 30 may comprise a pair of air tanks 45 mounted on the underside of bottom 27 of dump truck 20 adjacent forward end 25 thereof and a pair of air tanks 46 mounted on the underside of bottom 27 of dump truck 20 adjacent rearward end 26 thereof. In some cases, construction of dump truck 20 may be such that mounting of a pair of air tanks 46 adjacent rearward end 26 thereof is impractical due to various of the truck structure, such as the dump bed interconnection, license plate holder, rear wheel flaps, etc., in which case but a single air tank 46 may be used.

As shown in FIG. 1, the outlet 32 of conduit means 31 interconnected to one air tank 46 is preferably juxtaposed to open into dump bed 23 at the lower side corner thereof adjacent rearward end 26 of dump bed 23 opposite the outlet 32 of conduit means 31 interconnected to the other air tank 46, for discharge of compressed air therethrough to initiate unloading of dump bed 23. In dumping of a material from a dump truck, the initial part of the load will usually readily gravitate out of the dump truck. However, in the case of a load of particulate material which is or has become wet, and which has been hauled any appreciable distance, the load may become extremely compacted, to the extent that even initial unloading cannot be readily accomplished, in which instances it is necessary to forcefully initiate unloading such as by way of discharge of a blast of compressed air from air tanks 46.

Figure 2:
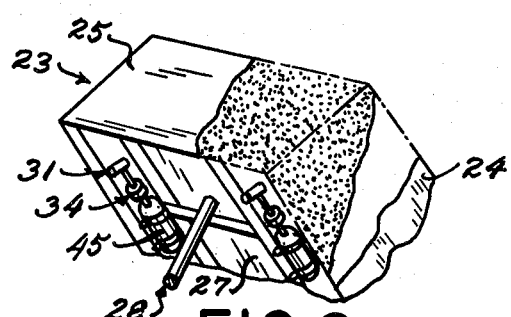
FIG. 2 is a perspective view of the upper end of the dump bed of the dump vehicle of FIG. 1 and showing material as lodged in the upper end of the dump bed thereof.

On the other hand, it is not at all unusual for parts of a load to adhere within the forward end 25 of dump bed 23, particularly at the side corners thereof, after the main part of the load has been dumped, as shown in FIG. 2. Thus, as shown in FIGS. 1 and 2, outlet 32 of conduit means 31 interconnected to one air tank 45 is preferably juxtaposed to open into dump bed 23 at the lower side corner thereof adjacent forward end 25 of dump bed 23 opposite the outlet 32 of conduit means 31 interconnected to the other air tank 45, for discharge of compressed air therethrough to facilitate unloading of material adhering at forward end 25 of dump bed 23.

In order to inhibit particulate material of the load from being ingested into conduit means 31, which is particularly likely to occur when outlet 32 thereof opens through bottom 27 of dump bed 23, I preferably provide flexible flap means 50 for each outlet 32, as shown in FIGS. 3 and 6. Flap means 50 may be interconnected along one side thereof to dump bed 23, such as by bolts 52, hingedly moving away from outlet 32 on discharge of compressed air therethrough, as shown in dot and dash lines in FIGS. 3 and 6.

Also, when conduit means 31 open through bottom 27 of dump bed 23, any water in dump bed 23 is likely to flow into conduit means 31. I thus preferably provide each conduit means 31 with a drain plug means 55 for draining water therefrom, as shown in FIG. 3.

Quick release valve means 34 may comprise any conventional type of valve that opens quickly to permit release of a substantial blast of compressed air from air tank means 30, through conduit means 31, and into dump bed 23. As shown, quick release valve means 34 may comprise a conventional pilot operated diaphragm valve means 57 having a conduit 58 interconnected thereto for pilot operation of diaphragm 59 thereof. Conduit 58 is operably connected to air supply circuit 35 intermediate check valve means 43 and pressure sensing valve means 41, compressed air in air supply circuit 35 thus acting on diaphragm 59 in closing diaphragm valve means 57 by pilot operation. Firing valve means 61 is preferably provided in air supply circuit 35 intermediate operable interconnection therewith of conduit 58 and pressure sensing valve means 41 for venting air supply circuit 35 to the atmosphere, which releases compressed air from conduit 58 and thereby acts on diaphragm 59 to open diaphragm valve means 57 by pilot operation thereof.

Actuator valve means 40 may comprise any conventional type of valve for shutting off and isolating air supply conduit 35 from truck air supply 29.

Pressure sensing valve means 41 may comprise any conventional type of valve which senses the adjusted pressure of the compressed air system of dump truck 20 and sequences release of compressed air therefrom ahd through air supply circuit 35 when the air pressure of truck air supply 30 exceeds that required for safe operation of the compressed air powered equipment of dump truck 20. As shown, pressure sensing valve means 41 may comprise a valve that is normally closed by adjustable spring 63, and includes an air operated piston 64 for opening thereof at a given pressure against the adjusted resistance of spring 63. For instance, truck air supply 29 may require a pressure of approximately 60 p.s.i. for safe operation of air brakes. To provide a margin of safety, adjustable spring 63 may be loaded so that pressure sensing valve means 41 remains closed until the compressed air system of the truck reaches 80 p.s.i., at which pressure piston 64 will counteract the resistance of spring 63 and open pressure sensing valve means 41.

Check valve means 43 may comprise any conventional type of check valve to prevent feedback from air tank means 30 through air supply circuit 35 such as when firing valve means 61 is actuated and when the compressed air pressure of truck air supply 29 is less than that of air tank means 30, thus assuring a maximum discharge pressure from air tank means 30.

Since some parts of my compressed air discharge system may be attached to truck chassis 22 and other parts attached to dump bed 23, I preferably provide air supply circuit 35 with an extendable store of flexible tubing 66, which permits an extension of air supply circuit 35 when dump bed 23 is raised to a dumping position from truck chassis 22.

As shown in FIG. 4, air supply circuit 35 may be bifurcated, one bifurcation 67 thereof being operably interconnected to air tanks 45 and the other bifurcation 68 thereof being operably interconnected to air tanks 46, a firing valve means 61 being operably interconnected with each bifurcation 67 and 68 thereof so that the diaphragm valve means 57 operably interconnected to air tanks 45 may be operated independently from diaphragm valve means 57 operably interconnected to air tanks 46.

In operation of compressed air discharge system B, dump bed 23 of dump truck 20 is raised to dumping position as shown in FIG. 1. If raising of dump bed 23 does not initiate dumping, firing valve means 61 of bifurcation 68 of air supply circuit 35 is actuated, venting air to the atmosphere from bifurcation 68 in pilot valve operation of diaphragm valve means 57 interconnected to air tanks 46, which releases a blast of air from air tanks 46 and into the rearward portion of dump bed 23 to initiate dumping. If some part of the load remains in the forward part of dump bed 23, as shown in FIG. 2, firing valve means 61 of bifurcation 67 of air supply circuit 35 is actuated, venting air to the atmosphere from bifurcation 67 in pilot valve operation of diaphragm valve means 57 interconnected to air tanks 45, which releases a blast of air from air tanks 45 and into the forward portion of dump bed 23 to facilitate dumping of material adhering therewithin.

The resultant blast of air into dump bed 23 from each air tank means 30 pressurizes the area where material is lodged, exerting a pressure to relocate the material and compressed air to an area of reduced pressure. The latent or potential energy (external energy) of the released compressed air is thereby converted to kinetic energy of moving air and material. As the compressed air enters the dump bed and mixes with the material therein, it tends to fluidize the material and reduce the binding tension thereof. The air bubbles of compressed air travel through fissures of the material and generate shear planes therein in travel of the compressed air to reduced pressure areas. This induces an effect similar to an air slide in which friction between particles of the material is reduced by the compressed air bubbles released thereinto, which reduced friction causes the particles of material to fall along the angle of dump bed 23 to a lower level thereof on a fluidizing bed of air. This fluidizing effect can be more or less significant than the blast effect of compressed air, depending on the nature of the material to be dislodged.

Figure 5:
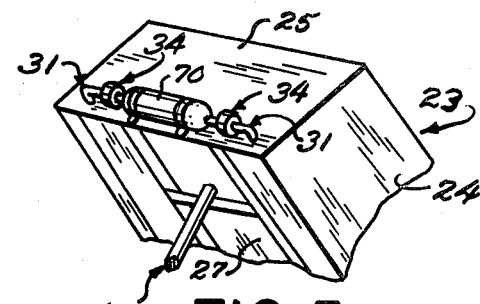
FIG. 5 is a view similar to FIG. 2 and showing a modified form of my improved compressed air discharge system.

In compressed air discharge system C, air tank means 30 may comprise an air tank 70 having a pair of conduit means 31 interconnected thereto, the outlet 32 of one conduit means 31 preferably opening into dump bed 23 adjacent one side corner thereof and the outlet 32 of the other conduit means 31 opening into dump bed 23 adjacent the other side corner thereof. As shown in FIG. 5, air tank 70 may be exteriorly mounted at the forward end 25 of dump bed 23.

In operation of compressed air discharge system C, after raising of dump bed 23 of dump truck 20 to a dumping position, firing valve means 61 is actuated, venting air to the atmosphere from air supply circuit 35 in concurrent pilot valve operation of diaphragm valve means 57 of each conduit means 31 for release of compressed air from air tank 70, through each conduit means 31 thereof, and into dump bed 23.

In some instances it may be desirable to provide for independently operated discharge of compressed air into dump bed 23 at spaced apart locations at the same end of dump bed 23, for instance if a load is adhering at only one corner of dump bed 23. Compressed air discharge system D shows a form of the invention which may be used for this purpose.

In compressed air discharge system D, air tank means 30 may comprise a pair of air tanks 72 and 73 having conduit means 31 interconnected thereto for discharge of compressed air into dump bed 23 at spaced apart locations. Air supply circuit 35 thereof may be bifurcated, one bifurcation 75 thereof being operably interconnected to air tank 72 and the other bifurcation 76 thereof being operably interconnected to air tank 73, a firing valve means 61 being operably interconnected with each bifurcation 75 and 76 so that diaphragm valve means 57 operably interconnected to air tank 72 may be pilot operated independently from diaphragm valve means 57 operably interconnected to air tank 73.

It is obvious that conduit means 31 of compressed air discharge system D could be positioned for release of compressed air into any desired part of dump bed 23, for instance, conduit means 31 of air tank 72 being disposed for discharge of compressed air into dump bed 23 adjacent one end thereof, and conduit means 31 of air tank 73 being disposed for discharge of compressed air into dump bed 23 adjacent the other end thereof.

It is also obvious that air tank means 30 of compressed air discharge systems B and D may comprise such as multiple discharge air tank 70 or any combination of single and multiple discharge air tanks, or that air tank means 30 of compressed air discharge system C comprise a single discharge air tank such as air tank 72 of compressed air discharge system D, each air discharge system being readily adaptable in this regard.

It is readily apparent that air tank means 30 of all forms of this invention may be attached to any appropriate part of dump truck 20 and that outlet 32 of the conduit means 31 of each may be positioned to open into such area or areas of dump bed 23 as may be desired.

Various changes may be made to the forms of the invention herein shown and described without departing from the spirit of the invention or the scope of the following claims.

I claim:

1. In a dump bed vehicle having a compressed air system including an air compressor and reservoir for maintaining a supply of compressed air, the combination with said vehicle of a compressed air discharge system for facilitating the unloading of material lodged in the dump bed thereof, said system including air tank means for receiving a supply of compressed air and conduit means having operable interconnection to said air tank means and an outlet juxtaposed to open into said dump bed for discharge of compressed air from said air tank means and into said dump bed in generating air shear planes through material lodged within said dump bed, quick release valve means having operable interconnection to said conduit means for discharge of a substantial blast of compressed air from said air tank means and into said dump bed through said outlet of said conduit means, and an air supply circuit having operable interconnection to said compressed air system of said dump bed vehicle and said air tank means for transmission of compressed air from said compressed air system of said dump bed vehicle and into said air tank means, said air supply circuit including pressure sensing valve means to sequence bleeding of compressed air from said compressed air system of said dump vehicle and into said air supply circuit as air pressure of said compressed air system of said dump bed vehicle exceeds that required for normal operation of said compressed air system of said dump bed vehicle and check valve means for preventing discharge of compressed air from said air tank means and into said compressed air system of said dump bed vehicle when the air pressure of said compressed air system of said dump bed vehicle is less than that of said air tank means.

2. The combination as specified in claim 1 wherein said quick release valve means comprises diaphragm valve means having operable pilot interconnection with said air supply circuit intermediate said pressure sensing valve means and said check valve means thereof for pilot operation of said diaphragm valve means on venting of air from said air supply circuit, and said air supply circuit includes firing valve means for venting air therefrom, said firing valve means being positioned in said air supply circuit intermediate said pressure sensing valve means thereof and pilot interconnection therewith of said diaphragm valve means.

3. The combination as specified in either of claims 1 or 2 and including flap means for said outlet of said conduit means for inhibiting material of said dump bed from entering said outlet of said conduit means.

4. The combination as specified in either of claims 1 or 2 and having a plurality of said conduit means operably interconnected to each said air tank means thereof, said outlet of each said conduit means of each said air tank means opening into said dump bed at spaced apart areas thereof from each other.

5. The combination as specified in either of claims 1 or 2 and including a plurality of said air tank means having at least one said conduit means operably interconnected to each, said quick release valve means having operable interconnection to each said conduit means being operable independently of each other.

6. The combination as specified in either of claims 1 or 2 and including a plurality of said air tank means having at least one said conduit means operably interconnected to each, said quick release valve means having operable interconnection to at least one said conduit means being operable concurrently with those of at least another.

7. The combination as specified in claim 4 wherein said dump bed vehicle comprises a dump truck including a substantially rectangular dump bed having said air tank means exteriorly mounted adjacent the forward end thereof, said air tank means including a pair of said conduit means, the outlet of one said pair of conduit means opening into said dump bed at the forward end thereof adjacent a lower side corner thereof and the outlet of the other of said pair of conduit means opening into said dump bed at the forward end thereof adjacent the opposite lower front side corner thereof.

8. The combination as specified in claim 6 wherein said dump bed vehicle comprises a dump truck including a substantially rectangular dump bed and having at least a pair of said air tank means, said air tank means being mounted on the underside of said dump bed adjacent one end thereof, the outlet of said conduit means having operable interconnection to one of said at least a pair of said air tank means opening into said dump bed adjacent one side corner thereof and said conduit means having operable interconnection to the other of said at least a pair of said air tank means opening into said dump bed adjacent the opposite side corner thereof.

9. The combination as specified in either of claims 1 or 2 wherein said dump bed vehicle comprises a dump truck including a substantially rectangular dump bed, at least one said air tank means being mounted on the underside of said dump bed adjacent one end thereof, said outlet of said conduit means having operable interconnection with said at least one said air tank means opening into said dump bed at the underside adjacent such one end thereof, and at least another said air tank means being mounted on the underside of said dump bed adjacent the other end thereof, said outlet of said conduit means having operable interconnection with said another said air tank means opening into said dump bed at the underside adjacent such other end thereof, said quick release valve means having operable interconnection to said conduit means having operable interconnection to said at least one said air tank means being operable independently from said quick release means having operable interconnection to said conduit means having operable interconnection to said at least another said air tank means.

10. The combination as specified in claim 1 wherein said dump bed vehicle comprises a dump truck including a substantially rectangular dump bed, at least one said air tank means being mounted on the underside of said dump bed adjacent one end thereof, said outlet of said conduit means having operable interconnection with said at least one said air tank means opening into said dump bed at the underside adjacent one end thereof, at least another said air tank means being mounted on the underside of said dump bed adjacent the other end thereof, said outlet of said conduit means having operable interconnection with said at least another said air tank means opening into said dump bed at the underside adjacent such other end thereof, said quick release valve means having operable interconnection to said conduit means having operable interconnection to said at least one said air tank means being operable independently from said quick release valve means having operable interconnection to said conduit means having operable interconnection to said at least another said air tank means, said air supply circuit being at least bifurcated, one bifurcation thereof being interconnected to said at least one said air tank means and the other bifurcation thereof being interconnected to said at least another said air tank means, said pressure sensing valve means being located in said air supply circuit intermediate operable interconnection thereof with said compressed air system of said dump bed vehicle and the locus of bifurcation of said air supply circuit, said quick release valve means comprising diaphragm valve means, said diaphragm valve means having operable interconnection to said conduit means having operable interconnection to said at least one said air tank means having operable pilot interconnection with one bifurcation of said air supply circuit for pilot operation thereof on venting of air from such one bifurcation of said air supply circuit and said diaphragm valve means having operable interconnection to said conduit means having operable interconnection to said at least another said air tank means having operable pilot interconnection with the other bifurcation of said air supply circuit for pilot operation thereof on venting of air from such other bifurcation of said air supply circuit, one said check valve means of said air supply circuit being located in each bifurcation thereof intermediate operable interconnection thereof with said air tank means interconnected thereto and operable pilot interconnection of said diaphragm valve means therewith, each bifurcation of said air supply circuit including firing valve means for venting air therefrom, said firing valve means of each bifurcation of said air supply circuit being positioned intermediate the locus of bifurcation thereof and operable pilot interconnection therewith of said diaphragm valve means.

11. In a dump bed vehicle having a compressed air system including an air compressor and reservoir for maintaining a supply of compressed air, the combination with said vehicle of a compressed air discharge system for facilitating the unloading of material lodged in the dump bed thereof, said system including air tank means for receiving a supply of compressed air and conduit means having operable interconnection to said air tank means and an outlet juxtaposed to open into said dump bed for discharge of compressed air from said air tank means and into said dump bed in generating air shear planes through material lodged within said dump bed, quick release valve means having operable interconnection to said conduit means for discharge of a substantial blast of compressed air from said air tank means and into said dump bed through said outlet of said conduit means, and an air supply circuit having operable interconnection to said compressed air system of said dump bed vehicle and said air tank means for transmission of compressed air from said compressed air system of said dump bed vehicle and into said air tank means, said air supply circuit including valve means for selectively bleeding compressed air from said compressed air system of said dump vehicle and into said air supply circuit and valve means for preventing discharge of compressed air from said air tank means and back through said air supply circuit, said quick release valve means comprising diaphragm valve means having operable interconnection with said air supply circuit for pilot operation thereof on venting of air from said air supply circuit, said second mentioned valve means of said air supply circuit being located therewithin intermediate operable interconnection thereof with said air tank means and operable pilot interconnection of diaphragm valve means therewith, and said first mentioned valve means comprises means for venting air for said air supply circuit, said last mentioned valve means being located in said air supply circuit intermediate operable interconnection thereof with said air tank means and operable pilot operation interconnection therewith of said diaphragm valve means.

12. The combination as specified in either of claims 10 or 11 and including flap means for said outlet of each said conduit means for inhibiting material of said dump bed from entering said outlet of said conduit means.

* * * * *